July 24, 1923.

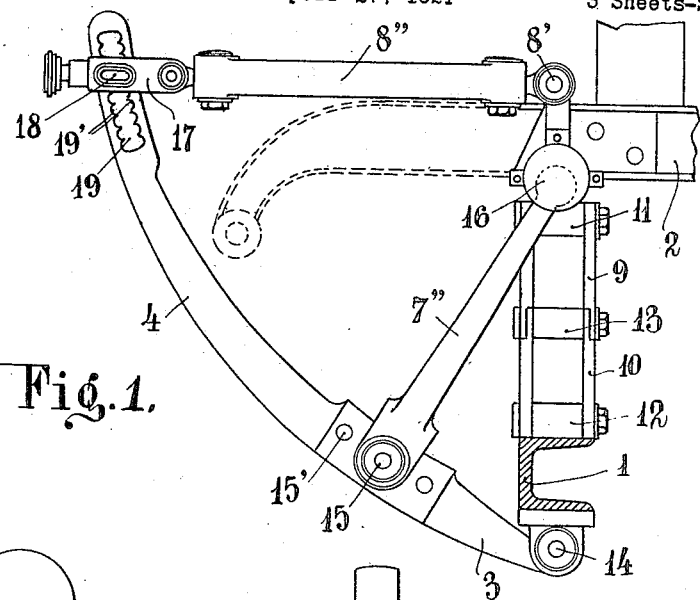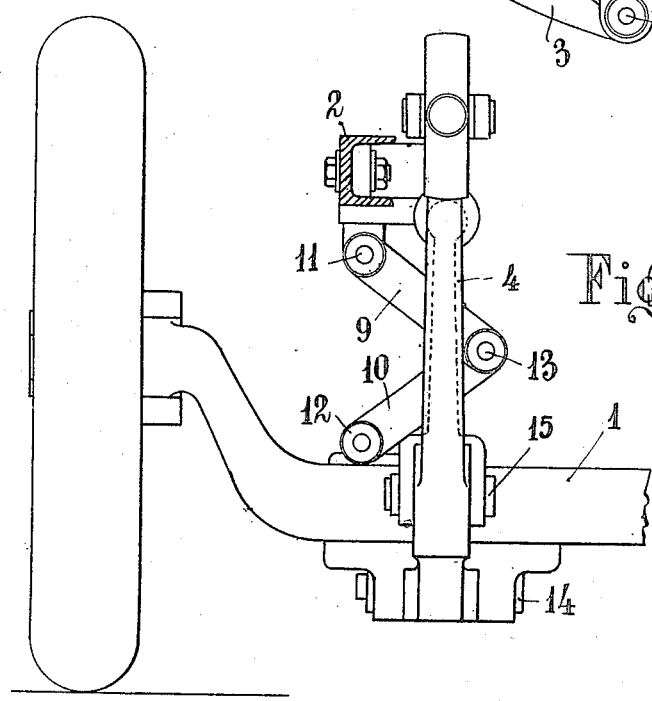

G. ANTONELLI

SHOCK ABSORBER

Filed April 27, 1921

1,462,731

3 Sheets-Sheet 2

Inventor
Giuseppe Antonelli
By Lawrence Langner Atty

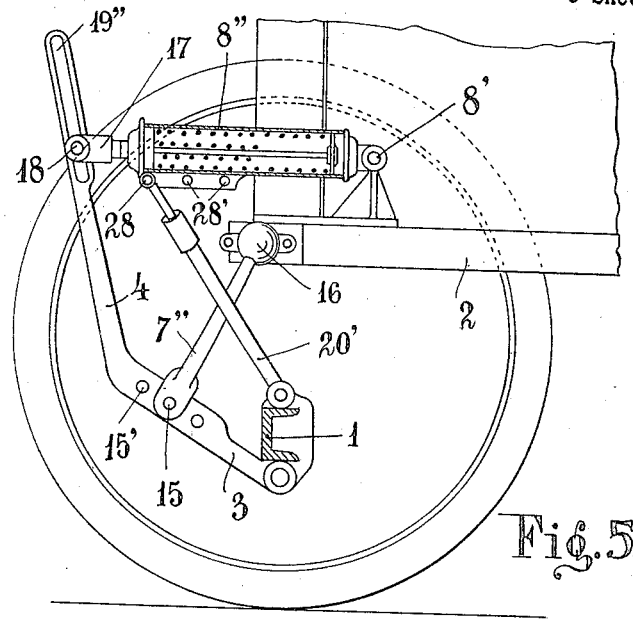
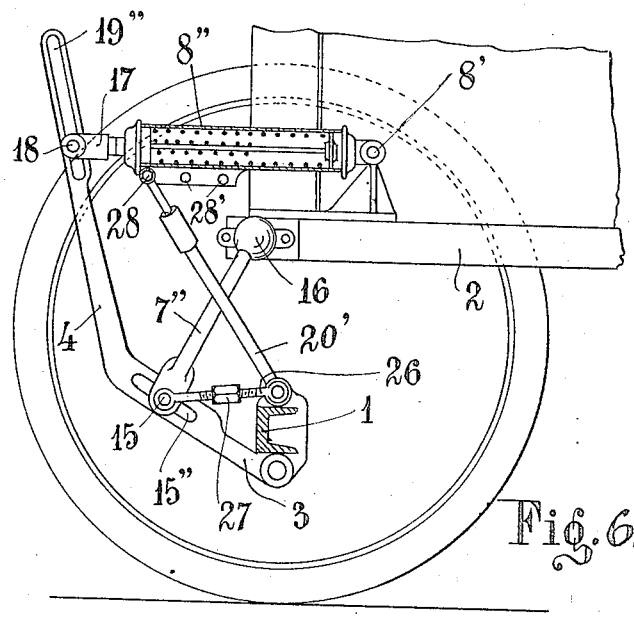

Patented July 24, 1923.

1,462,731

UNITED STATES PATENT OFFICE.

GIUSEPPE ANTONELLI, OF TURIN, ITALY.

SHOCK ABSORBER.

Application filed April 27, 1921. Serial No. 464,828.

*To all whom it may concern:*

Be it known that I, GIUSEPPE ANTONELLI, a subject of the King of Italy, and resident of Turin, Italy, have invented certain new and useful Improvements in Shock Absorbers, of which the following is a specification.

This invention has for its object a device for resiliently connecting parts subjected to relative displacements.

The device according to this invention may be used with advantage in the vehicle suspension for the purpose of absorbing the shocks imparted to the vehicle frame when the vehicle is running.

The device according to this invention comprises an arm pivoted to both the parts intended to be interconnected and having one end engaged with a buffer or resilient member which is adapted to be deformed under the effect of said shocks and to restore the parts in their normal position.

This invention comprises also means for adjusting at will the leverage of said arm as well as an arrangement by which the leverage of said resilient member or buffer is increased automatically during the operation for damping progressively the motion of the parts.

Figure 3:
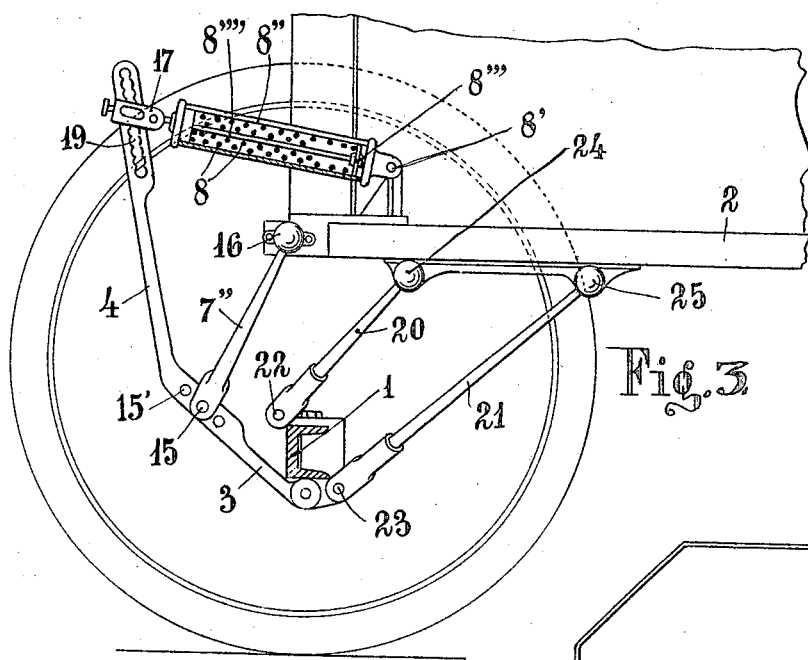
Figure 4:
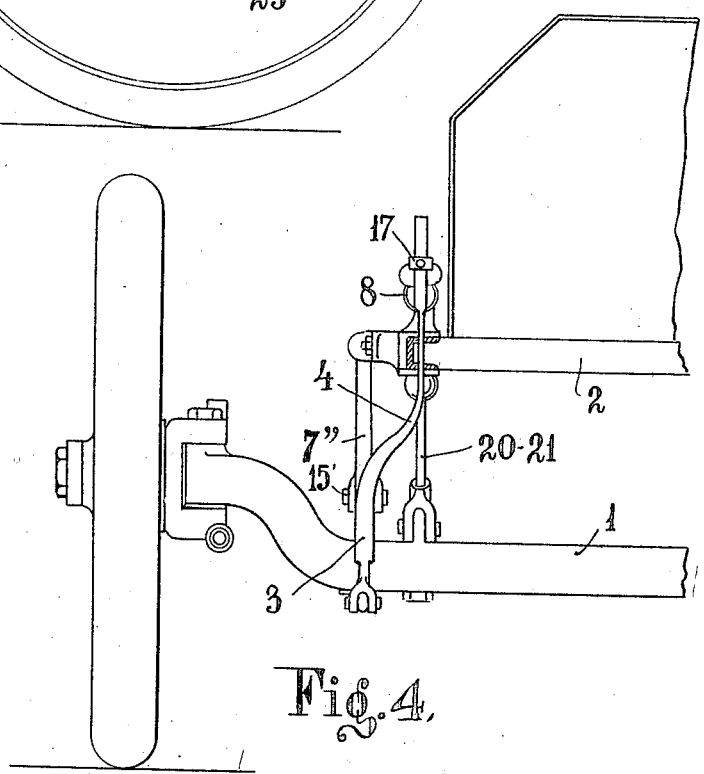

The annexed drawings show by way of example some embodiments of the device according to this invention as applied to the suspension of a vehicle; Figure 1 is a side view of one end of an axle with the adjacent part of the frame showing an embodiment of the shock damping device according to this invention; Figure 2 is a front view of Figure 1; Figure 3 is a side view of a modified construction; Figure 4 is the front view of the same; Figures 5 and 6 are the side views of further embodiments.

In Figs. 1 and 2 the numeral 1 is the axle which is connected to the frame 2 by means of two links 9 and 10 pivoted at 11 and 12 to the frame 2 and to the axle 1, respectively, and pivoted to each other at 13. To the axle 1 is further pivoted at 14 the end of one arm 3 of a lever 3—4 which is pivoted by means of a pin 15 at the end of a rod 7″ having its opposite end connected to the frame 2 by means of a ball joint 16. Said lever 3—4 is provided with a number of holes 15′—15′, in either of which may be inserted a pivoting pin 15 connecting it with the rod 7″, for the purpose of adjusting the leverage ratio of the arms 3—4.

The free end of the arm 4 of the lever 3—4 is connected with a resilient member shown as a whole by 8″ which is pivoted at 8′ to the frame 2; said arm 4 and resilient member 8″ are connected by means of a link 17 pivoted to a part of said resilient member and having a pin 18 which may be engaged with the arm 4 at an adjustable distance from its pivoting point 15–; this is obtained by means of a slot 19 provided in said arm 4 and having recessed portions 19′ in either of which may be inserted said pin 18.

This arrangement provides for the adjustment of the value of the spring action because by connecting the link 17 to the arm 4 at a point more or less spaced from the pivot point 15 of the lever 3—4 the leverage of the spring or resilient member on said arm is modified.

Said resilient member acts as the extensible bar of a deformable system of bars consisting of the arm 4 and rod 7″, and whose deformations are due to the displacement of the frame 2 with regard to the axle 1.

The connection of the frame 2 with the axle 1 may also be obtained by means of rods 20 and 21 having one end pivoted to the axle at 22 and 23 and the opposite ends connected to the frame by means of ball joints 24 and 25. This construction is shown by Figures 3 and 4 in which the other parts are similar to those described in connection with Figures 1 and 2, and do not require further description. In Figure 3 is further shown in section a construction of resilient member comprising a box 8″ pivoted at 8′ to the frame, and a plunger 8‴ connected by a rod 8⁗ to the link 17; springs 8 are enclosed in said box 8″ and are adapted to act against the plunger 8‴.

Figure 5 shows a further arrangement for spring connecting the axle 1 with the frame 2; this arrangement comprises a lever 3—4 having one end pivoted to the axle 1 and connected at an intermediate adjustable point 15 with the lower end of a rod 7″ which has its opposite end connected with the frame 2 by means of a ball joint 16.

The deformable system of bars is completed by a rod 20′ having one end pivoted to the axle 1 and the other one pivoted to the free end of the resilient member 8″ by means of a pin 28 which may be inserted in either of the holes 28′ for the purpose of adjustment.

In this arrangement the pin 18 engaging the resilient member 8″ with the arm 4 of the lever 3—4 must be free to move along said arm and therefore this arm is provided with a slot 19″ through which may slide said pin 18. Then when the frame moves towards the axle, the deformation of the system of bars gives rise to a displacement of the pin 18 towards the end of the slot 19″ removed from the pivot 15 of the lever 3—4 and thus the leverage of the resilient member 8″ in counteracting said deformation is increasing to the same extent as said deformation.

By this arrangement is obtained a damping action whose value is progressively increasing as required for damping the shocks without giving rise to sudden reactions of the springs.

Finally the construction according to Figure 6 provides means for modifying at will the leverage ratio of the arms 3—4 without removing the pivot pin of the rod 7″. In this construction the lever 3—4 instead of having holes 15′ is provided with a slot 15″ in which may slide the pin 15 connected to the arm 7″ and the position of said pin in said slot may be modified by means of a tie 26 whose length may be adjusted by the manipulation of a screw coupling 27; further an automatic increase in the leverage ratio is obtained.

In any case the described device provides a spring suspension doing away with the blade springs usually found in vehicles, with the advantage that the shock damping action is imparted by a member which may be well protected and easily adjusted as a spring buffer, a fluid brake or a rubber pad.

It is to be understood that many changes may be made in the above described constructions without coming out of this invention which is only defined by appended claim, and that the resilient member may be of any known or desired type, the embodiment illustrated being merely given by way of example.

What I claim as my invention and desire to secure by United States Letters Patent is:—

A device for resiliently connecting the axle with the frame of a vehicle, comprising an arm having one end pivotally connected to the axle, a rod pivotally connected to the frame and to an intermediate point of said arm, said arm having a slot at its free end; a buffer comprising a rigid member pivotally connected at one end with the frame, a member slidable in said rigid member and engaging the slot of said arm and resilient means between said two members, and a bar connecting the free end of the rigid member of said buffer with the axle of the vehicle.

Signed at Turin, Italy, this 25th day of March A. D. 1921.

GIUSEPPE ANTONELLI.